United States Patent
Peterka et al.

(10) Patent No.: US 9,154,508 B2
(45) Date of Patent: Oct. 6, 2015

(54) DOMAIN MEMBERSHIP RIGHTS OBJECT

(75) Inventors: Petr Peterka, San Diego, CA (US); David Kravitz, Fairfax, VA (US); Paul Montague, Highbury (AU)

(73) Assignee: Google Technology Holdings LLC, Mountain View, CA (US)

( * ) Notice: Subject to any disclaimer, the term of this patent is extended or adjusted under 35 U.S.C. 154(b) by 1885 days.

(21) Appl. No.: 11/962,953

(22) Filed: Dec. 21, 2007

(65) Prior Publication Data

US 2009/0165101 A1    Jun. 25, 2009

(51) Int. Cl.
G06F 7/04 (2006.01)
H04L 29/06 (2006.01)
G06F 21/10 (2013.01)

(52) U.S. Cl.
CPC .............. *H04L 63/104* (2013.01); *G06F 21/10* (2013.01); *G06F 2221/2141* (2013.01); *H04L 2463/101* (2013.01)

(58) Field of Classification Search
CPC ............ G06F 21/10; G06F 2221/2141; H04L 63/104; H04L 63/2463; H04L 63/101
USPC ............................................................... 726/6
See application file for complete search history.

(56) References Cited

U.S. PATENT DOCUMENTS

2009/0217036 A1*  8/2009  Irwin et al. .................... 713/168
2009/0235330 A1*  9/2009  Byun et al. ........................ 726/4
2010/0281262 A1* 11/2010  Cheng et al. .................. 713/171

OTHER PUBLICATIONS

Open Mobile Alliance, DRM Architecture, Approved Version 2.0—Mar. 3, 2006, OMA-AD-DRM-V2_0-20060303-A.
Open Mobile Alliance, Enable Release Definiation for DRM V2.0, Approved Version 2.0—Mar. 3, 2006, OMA-ERELD-DRM-V2_0-20060303-A.
Open Mobile Alliance, OMA DRM Requirements, Approved Version 2.0—Mar. 3, 2006, OMA-RD-DRM-V2_0-20060303-A.
Open Mobile Alliance, DRM Content Format, Approved Version 2.0—Mar. 3, 2006, OMA-TS-DRM-DCF-V2_0-20060303-A.
Open Mobile Alliance, DRM Specification, Approved Version 2.0—Mar. 3, 2006, OMA-TS-DRM-V2_0-20060303-A.
Open Mobile Alliance, DRM Rights Expression Language, Approved Version 2.0—Mar. 3, 2006, OMA-TS-DRM-REL-V2_0-20060303-A.

* cited by examiner

*Primary Examiner* — Krista Zele
*Assistant Examiner* — James Forman
(74) *Attorney, Agent, or Firm* — Amin, Turocy & Watson, LLP

(57) ABSTRACT

A method of providing permissions to consume content objects within a domain includes creating a domain and a domain membership rights object for each member. The domain facilitates the sharing of content objects amongst the members of the domain. The domain membership rights objects for each member include permissions for each member in the domain to consume content objects in the domain.

17 Claims, 6 Drawing Sheets

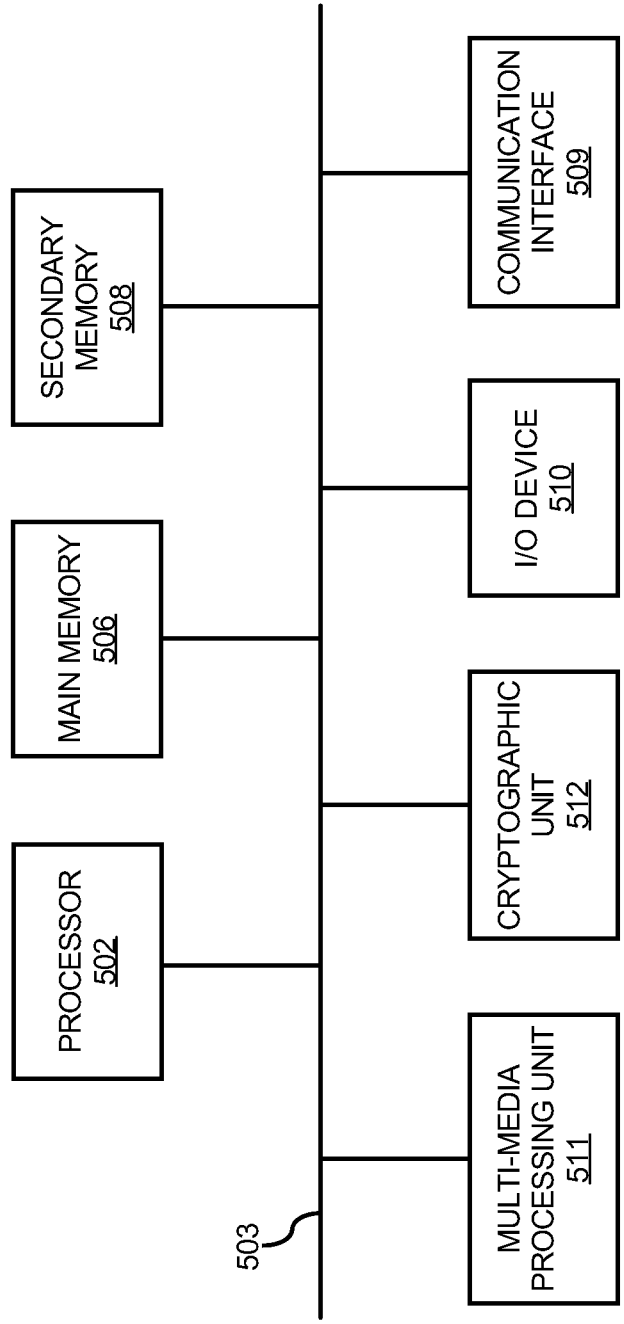

DOMAIN MEMBERSHIP RIGHTS OBJECT

BACKGROUND

Digital Rights Management (DRM) is a great concern for digital content owners, such as owners of songs, movies, electronic books, documents and other types of digital media. Content owners try to sell and/or distribute their content in such a way to prevent the illegal copying of their content. For example, content, such as songs, ringtones, video clips and even movies are widely sold or licensed and distributed electronically, such as over the Internet. To prevent illegal copying, content typically includes copy protection mechanisms that prevent users from making illegal copies and otherwise preventing unauthorized use of content.

The Open Mobile Alliance Group (OMA) has established specifications and protocols, e.g., OMA DRM v2, that enable content providers to grant permissions defining how their media objects can be consumed. The OMA DRM is independent of the media object formats and the given operating system or run-time environment. The media objects controlled by the OMA DRM can be a variety of media types, such as games, ring tones, photos, music clips, video clips, streaming media, etc.

According to the OMA DRM, a content provider sends a media object to a user, and the media object is encrypted with a corresponding content encryption key. Also, either the content provider acting as a rights issuer or a separate rights issuer sends a rights object (RO) that includes the content encryption key encrypted with the encryption key of the user's device. The RO also describes the permissions granted to the user for the media object. Then, the device decrypts to recover the content encryption key, and uses the content encryption key to access the media object. An agent running on the device allows the user to consume the media object according to the permissions granted in the RO.

The OMA DRM also allows a user to setup a domain so a media object can be shared among all the user's devices. For example, a user may purchase a song and download the song to the user's desktop. Then, the user desires to load the song on his portable media player. The user registers the portable media player as a member of the domain, so the song can be loaded and played on the portable media player.

The domain allows a user to share content among several devices. However, the domain in the OMA DRM is inefficient or unusable in certain situations. For example, if a user has a movie stored on a portable device and wants to play the movie at a friend's home, the user would have to make the friend's device a member of the domain. However, the content provider may not allow the friend to is become a member of the domain, because the friend is not a family member or because the device is not one of the user's devices. Furthermore, if the friend is made a member of the domain, when the move is done playing, the friend would have to be removed from the domain. According to the OMA DRM, when a device is removed from the domain, all the remaining devices in the domain should get a new domain key so the removed device cannot get access to new content. This is very inefficient.

Furthermore, the OMA DRM does not allow different members of a domain to have different permissions to media objects. This makes it difficult to restrict certain user permissions, such as restricting rights for media objects not suitable for children.

BRIEF DESCRIPTION OF THE DRAWINGS

Embodiments are illustrated by way of example and not limited in the following Figure(s), in which like numerals indicate like elements, in which:

FIG. 5 illustrates a computer system, according to an embodiment.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the description of the embodiments.

According to an embodiment, a domain membership rights object (DMRO) is provided to allow the granting of different permissions to different members of a domain. Permissions include rights and constraints. Constraints may include constraints on rights. The DMRO describes the permissions of a member of a domain to consume domain content objects. A content object may be a digital is work, such as a song, ringtone, video clip, movie, streaming video, etc. Consuming a content object includes an action performed on the content object, such as playing, displaying, copying, transferring, modifying, accessing, exporting, executing, lending, giving, etc. A content object includes a particular piece of content. For example, a content object may include a file containing a song, ringtone, movie, etc. Instead of a file, a content object includes content that may be provided in another type of data structure, a streaming media format, etc.

Figure 1:
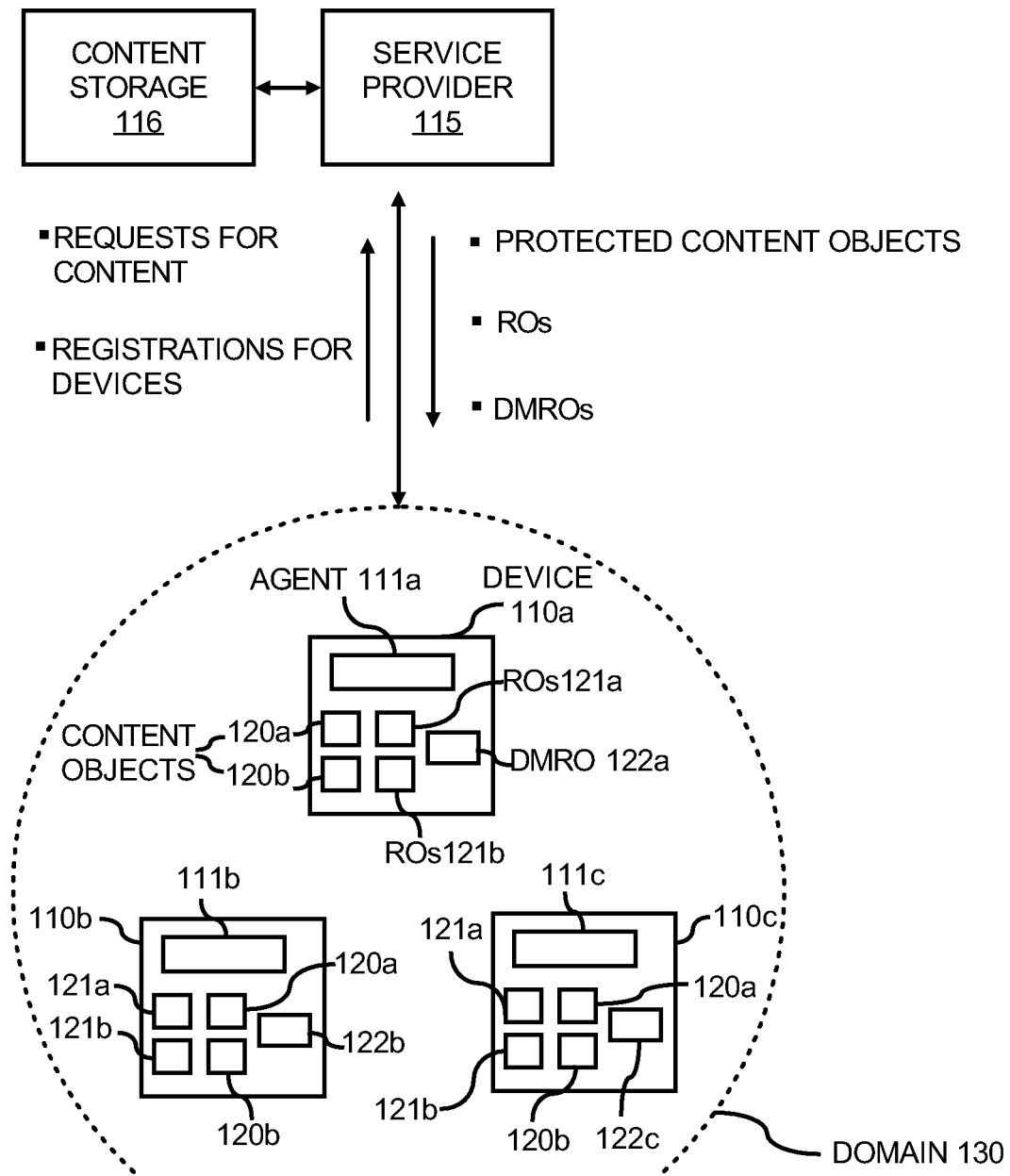
FIG. 1 illustrates a system, according to an embodiment.

FIG. 1 illustrates a system 100, according to an embodiment. The system 100 includes a plurality of devices 11a-c and a service provider 115. The devices 110a-c, for example, are provided in a domain 130. A domain comprises a plurality of members that are associated for sharing content. A member of a domain may include a device or an agent running on a device. For example, a device may include an agent comprised of software and configured to enforce digital rights for content objects. The devices 110a-c are shown including agents 111a-c. In many instances the devices in a domain belong to a single user, a single family or a single entity, and the domain may be created so the devices in the domain can share content objects as approved by a service provider or rights provider enforcing the digital rights of the content objects.

In one example, the devices 110a-c belong to family members for a single family. Content objects may be shared among the family members. For example, the content objects 120a-b are shown stored on all the devices 110a-c. These include copies of the same content objects on different devices.

The service provider 115 includes a content storage 116 storing content objects for distribution to users. FIG. 1 shows encrypted content objects, is such as the content objects 120a-b, distributed to the domain 130. This may include electronically transmitting the content objects 120a-b to the device 110a, such as via a network. The content objects 120a-b are shared with other members in the domain 130. For example, the device 110a may transmit the content objects 120a-b to the devices 110b-c or the devices 110b-c may receive the content objects 120a-b from the service provider 115.

The content objects 120a-b are encrypted to prevent unauthorized consumption. According to OMA, a content encryption key (CEK) is provided for each content object to prevent unauthorized consumption and the CEKs are distributed in rights objects (ROs) to devices. An RO may be in the form of an XML document, expressing permissions associated with the content object. Permissions may include allowed actions and constraints on actions, such as permission to display, play, execute, etc. for a predetermined period of time or counts. For example, the service provider 115 sends ROs 121a-b to the device 110a for each of the content objects 120a-b. The ROs 121a-b include permissions for consuming the content objects 120a-b and their CEKs. The permissions can be cryptographically protected against unauthorized modification. The ROs 121a-b may be protected in a way that makes them accessible only to the target agent 111a or the domain 130. For example, the ROs are encrypted with the device encryption key unique to the device 110a, and then only the device 110a can consume those objects. In another example, the ROs 121a-b are protected by encryption with a domain key for the domain 130. The domain key is distributed to all the members of the domain (i.e., devices 110a-c), for example, from the service provider 115. Then, each device can decrypt the ROs using the domain key and consume the content objects 120a-b using the CEKs in the ROs. The domain key may be distributed in the DMRO as described below.

According to an embodiment, another layer of rights protection is provided using DMROs. A DMRO is generated for each member of a domain and includes permissions specific to the member. For example, a user may desire that a domain member, such as the device 110c, should have different permissions for consuming content objects. A DMRO 122c is generated for the device 110c that includes different permissions than DMROs 122a-b for the devices 110a-b. The DMROs may include age restrictions to prevent children from viewing content that is not age-appropriate. Age restrictions may be based on an age-based parental rating ceiling that is related to a content rating in a RO. Other restrictions or constraints may allow consumption for a predetermined period of time, set a maximum number of plays, set a maximum number of copies, etc. Other permissions or constraints may include play-only (no copy), disallow export to other devices or domains or DRM systems, etc. A DMRO may be provided in the form of an XML document, similar to an RO. An agent running on a device consumes a content object in accordance with the permissions and constraints in the RO and the permissions and constraints in the DMRO. Also, the DMRO may include the domain key, which is used to decrypt an RO to get the CEK for decrypting a corresponding content object. Typically, the DMRO further restricts rights and permissions already associated with each individual content rights object rather than extending those rights.

Figure 2:
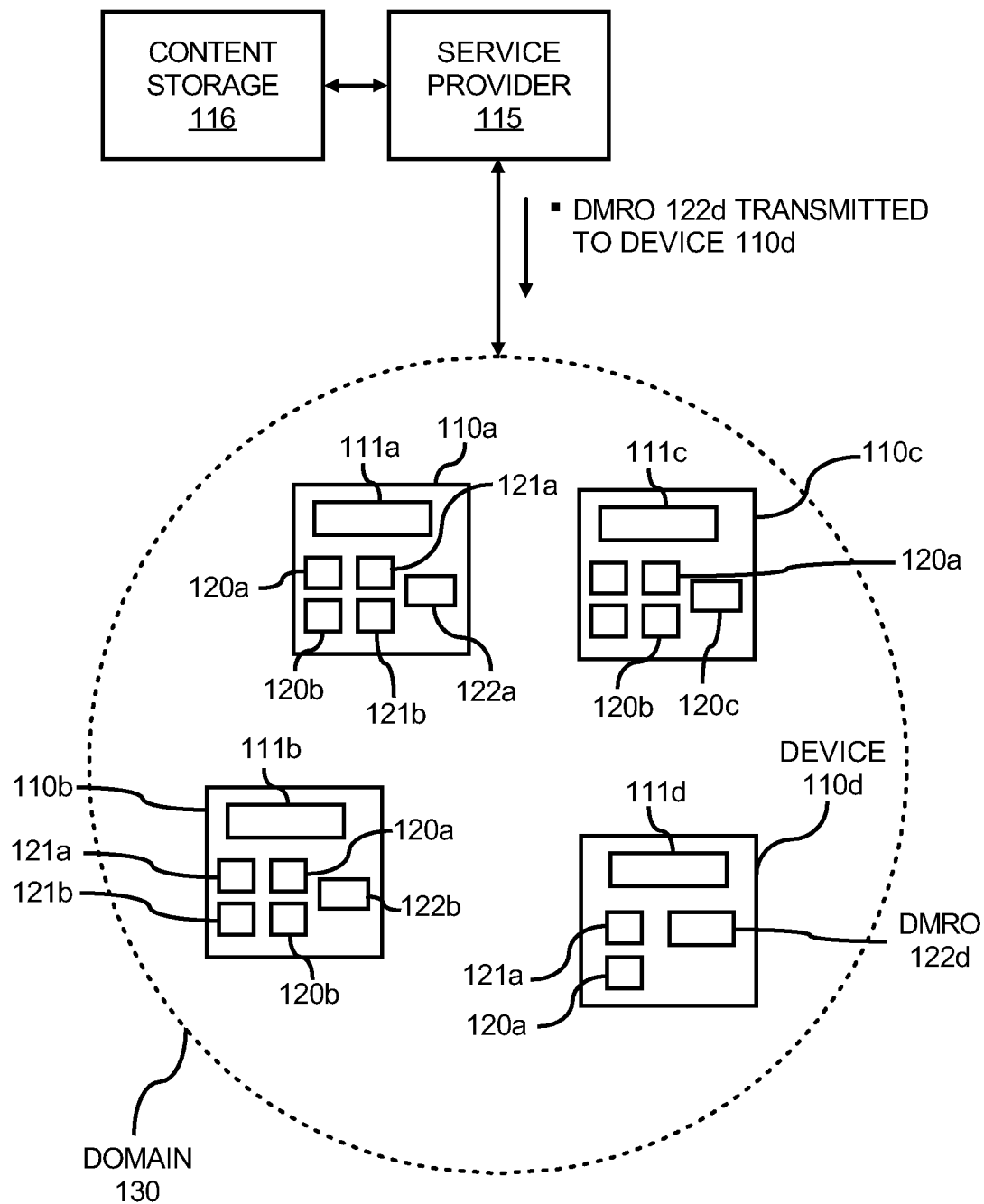
FIG. 2 illustrates adding a new device to a domain.

FIG. 2 illustrates adding a new device 110d to the domain 130. However, the device 110d is given permission to play content objects for the domain for a limited period of time. For example, the content object 120a is a movie. The user of device 110a visits a friend and wants to play the movie on the friend's device 110d. In order for the friend's device 110d to be able to play the content object 110a, the friend's device 110d is registered to be part of the domain 130. During the registration only a small subset of rights is requested (e.g. play only, play once, no copy, one day expiration, etc.) and may indicate a temporary nature of membership (e.g. should expire the next day or should not be automatically renewable without an explicit approval by the owner of the domain). A DMRO 122d is generated for the friend's device 110d and transmitted to the device 110d. The DMRO only allows the device 110d to play content objects for the domain for a limited period of time, such as 24 hours or only once. The device 110d receives the content object 110a and the RO for the content object 120a. The agent 111d on the device 110d uses the domain key from the DMRO 122d to decrypt the RO 121a and play the content object 120a. The agent 111d only allows the content object 120a to be played for the 24 hour period specified in the DMRO 122d. Note that this restriction applies to all content objects in the domain 130, and not just the content object 120a. Also, after the 24 hour period or later, the device 120d may be removed from the domain 130. For instance, the DMRO may have a renewal time indicated in it (e.g. 24 hours, 1 week, etc.). It may also indicate that it is a temporary membership and that it is not automatically renewable and should permanently expire after the renewal/expiration time is over.

In certain situations, a renewal of a domain may be invoked by distributing new domain keys to all the members of the domain. Then, any new content objects are accessed using the new domain key. For example, a determination may be made that the agent on the device 120d has been modified to ignore constraints in the DMRO 122d and can play content objects for the domain 130 for an unlimited period of time. Then, the service provider 115 sends a new domain key to all its members, not including the device 110d. Then, any new content objects distributed to one or more members of the domain 130 are only accessible using the new domain key. Thus, after a determination that a device in the domain has been compromised, such as by modifying a content object or agent, a new domain key may be distributed to predetermined members, excluding any compromised members.

The new domain key may be pushed to current domain members when available. Alternatively to receiving a domain key via a push, a device that is trying to use an RO for which it does not have the appropriate generation domain key may be automatically triggered to request that domain key. This may take the form of a request for a DMRO for that domain. A DMRO may include the current generation domain key as well as all previous generation domain keys for that domain. Alternatively, a DMRO may contain only the generation of the domain key that is current at the time of DMRO creation if previous generation domain keys can be derived from that one. This can be done via the use of hash chains in accordance with OMA DRM.

Domain key updating may be done periodically for preventive reasons, where devices that are no longer associated with the domain are not given access to the new generation domain key, whether or not they are suspected to have been compromised. Note that DMRO expiration does not need to coincide with domain key updates. When a service provider 115 issues a new DMRO to a device, it may or may not include a new version of the domain key at that time. It should include the most recent version of the domain key at the time of DMRO creation.

Even if a domain key is otherwise available, e.g., via standard OMA DRM domain join messaging, the child RO must indicate that it is only to be used in conjunction with a currently valid parent RO or DMRO that was issued for that domain for that specific device. It is thus insufficient for the child RO to just indicate the domain ID. A legacy device agent that acquires domain keys only through standard domain join messaging must reject use of a RO that indicates it is to be used only in conjunction with a DMRO specific to the device and the domain, unless the device agent can reliably determine if a parent RO meets these criteria. This determination may be implicit in that an appropriate parent RO may be communicated directly from a rights issuer to the device, as associated with a particular child RO. The child RO specifies the domain ID but cannot specify the DMRO ID, since the DMRO is generated for a specific device whereas the child RO, as a Domain RO, is to be used by all current and prospective members of that domain. The DMRO is cryptographically bound to a specific device. Each DMRO created for a specific device supersedes any DMRO created earlier for that device for that domain. DMROs for a specific device and for a particular domain should not be issued with overlapping validity periods if permissions and/or constraints are not identical across such DMROs.

Also, subdomains may be created within a household. Members of a subdomain may have different permissions than members not in the subdomain. They may also have access to different content within the household. A subdomain key may be provided for the subdomain but the subdomain key may not be in a hierarchy (e.g., there may be no hierarchy such as CEK-subdomain key-domain is key). A particular rights object may have one or more copies of the CEK encrypted by the main domain key and also one or more of the subdomain keys. Access may be automatically enabled, where, for example, the key for subdomain "I" is equal to a one-way hash of the concatenation of the domain key and the ID of subdomain "i". Alternatively, access may be via a "DMRO" that provides the encryption of one or more subdomain keys under the domain key. Technically, this alternative uses a different type of DMRO than the one discussed elsewhere in the claims and body text, since here the (sub)domain key is encrypted with a domain key rather than with a unique cryptographic key for the member.

Figure 3:
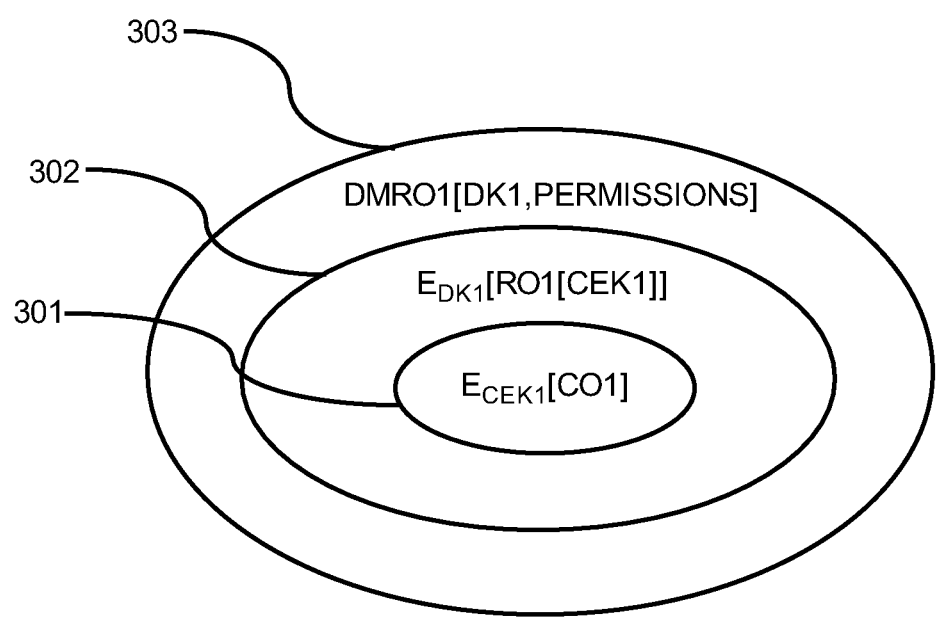
FIG. 3 illustrates a hierarchal representation of consumption controls, according to an embodiment.

FIG. 3 shows a hierarchical representation 300 of consumption control for content objects, according to an embodiment. An encrypted content object CO1 is in the lowest layer 301. The content object CO1 is encrypted with CEK1. The "E" represents encrypted and the subscript represents the encryption key. CEK1 is provided in a rights object RO1 in layer 302. The rights object RO1 may be encrypted by a domain key DK1, which is provided in layer 303. A domain membership rights object DMRO1, shown in layer 303, includes the domain key DK1 and permissions for a member in the domain to consume content objects in the domain, including content object CO1. Note that the DMRO has domain-wide permissions while the RO has permissions for a specific content object.

Figure 4A:
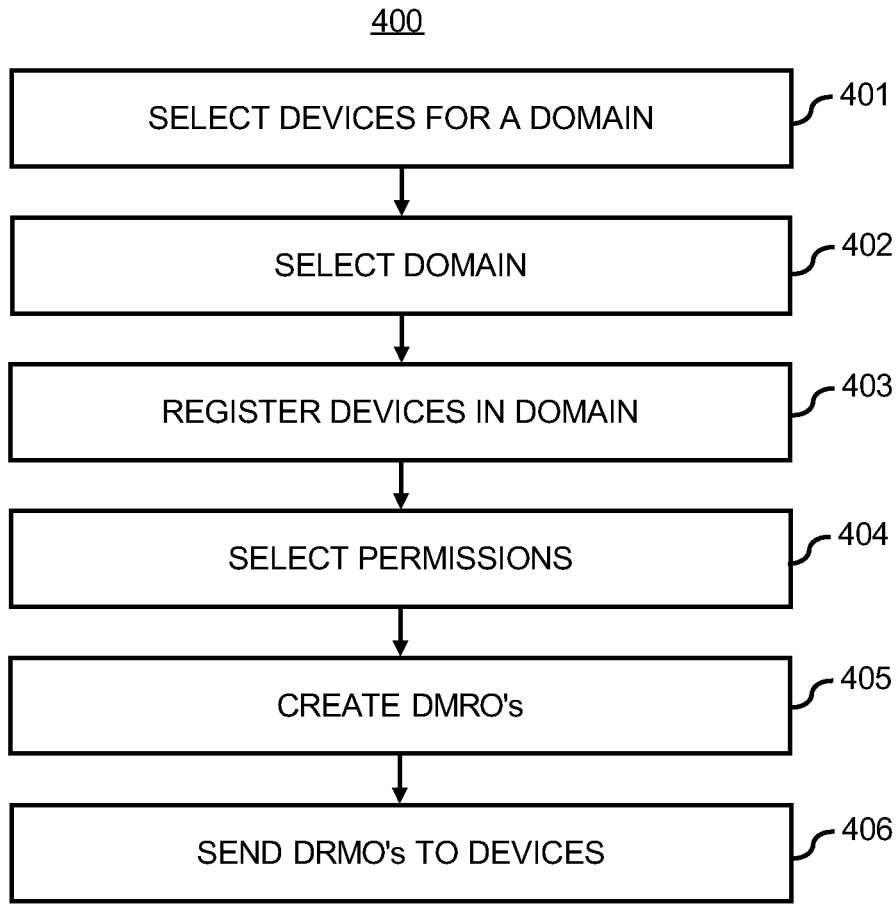
FIGS. 4A-C illustrate flowcharts for methods associated with domain membership rights objects, according to embodiments.
Figure 4B:
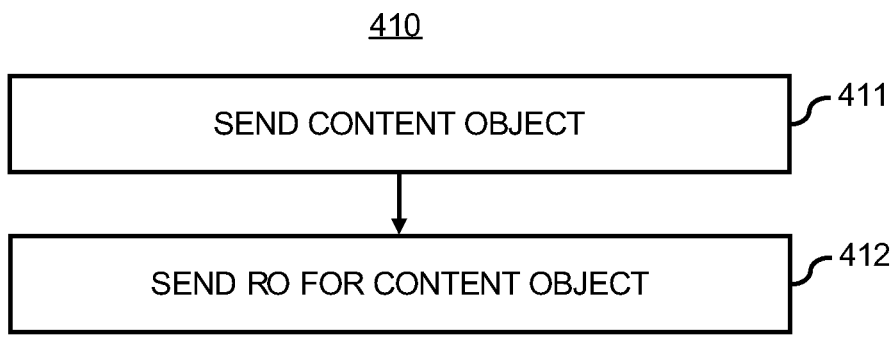
Figure 4C:
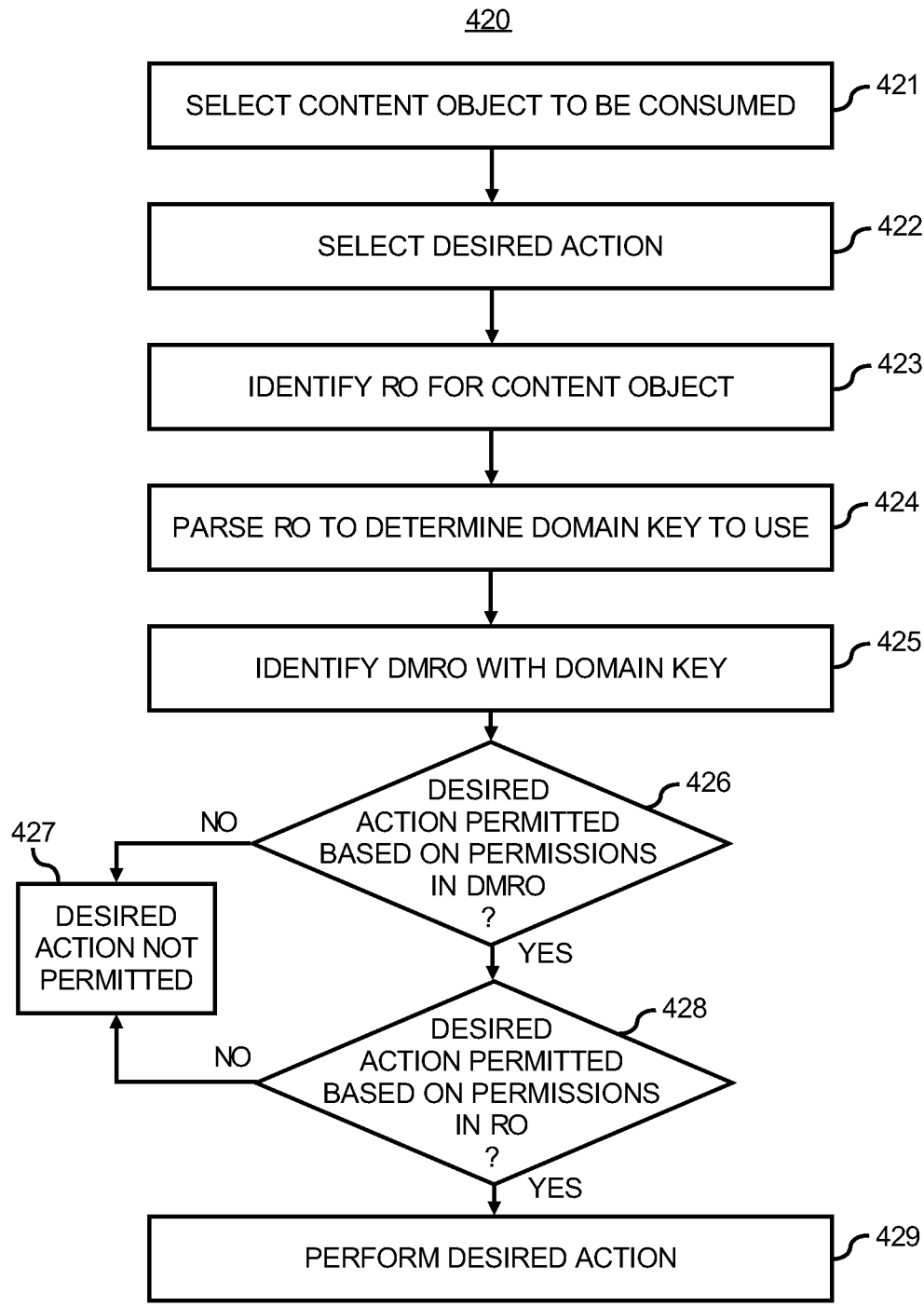

FIGS. 4A-C illustrate methods for joining a domain, getting a content object and consuming a content object, according to embodiments. The methods are described with respect to one or more of FIGS. 1-2 by way of example and not limitation.

FIG. 4A illustrates a method 400 for joining a domain and sending DMROs in response to joining the domain, according to an embodiment. At step 401, one or more devices are selected for a domain. The devices may be devices owned by a single user or that belong to a single household. At step 402, a domain is selected for the devices. This may include creating a new domain, or selecting an existing domain. For example, if a family purchases a new computer, they may want the computer to be included in an existing domain for their household.

At step 403, the device(s) are registered to be in the domain. For example, each of the devices 110a-c shown in FIG. 1 connects to the service provider 115 to become registered in the domain 130. The service provider may store registration information for each device, which may include device encryption keys. This is typically using public key cryptography and public key certificates. Other methods known in the art may be used. The service provider 115 may approve or disapprove a device for inclusion in a domain. Approval may come from a user (e.g., a parent), an authorized device, or some other trusted authority. At step 404, permissions are selected for any devices joining the domain. Permissions may be selected by a user, an authorized device, or some other trusted authority. The service provider 115 may also decide what permissions constraints to allocate to the DMRO based on the user of the device, the type of the device, the device attributes (e.g. portable vs. stationary, level of security, etc.). At step 405, DMROs are created for each device. For example, the DMROs 122a-c are sent to the devices 110a-c shown in FIG. 1. The DMROs include a domain key for content objects in the domain 130 and permissions for each member (i.e., device). At step 406, the DMROs are transmitted to the devices.

FIG. 4B illustrates a method 410 for getting a content object and a RO for the content object, according to an embodiment. At step 411, a content object is transmitted to a device in the domain. For example, the content objects 120a-b are transmitted to one or more members of the domain 130 and the members may share the content objects amongst each other. At step 412, an RO for the content object is transmitted to the device. For example, the ROs 121a-b are transmitted to the devices 110a-c. Users may also transfer ROs and content objects between devices directly.

FIG. 4C illustrates a method 420 for consuming the content object, according to an embodiment. At step 421 a content object is selected to be consumed. This may include a user selecting a stored content object to be consumed. At step 422, a desired action, such as play, copy, etc., is also selected. At step 423, a RO corresponding to the content object is identified. At step 424, the RO is parsed to determine which domain key to use. At step 425, a DMRO is identified with the required domain key.

At step 426, the permissions in the DMRO are compared with the desired action to determine whether the desired action is permitted. If the desired action is not permitted, then consumption is not permitted. That is the desired action is not performed at step 427. If the desired action is permitted, then at step 428, the permissions in the RO are compared with the desired action. If the desired action is not permitted, then consumption is not permitted. If the desired action is permitted, then at step 429, the desired action is performed.

The agent on the device may be responsible for assuring the rights and constraints in the permissions are met when the content object is consumed.

The devices 110a-c may include devices that are operable to communicate with other devices via a network or via a peer-to-peer connection. For example, the devices 110a-c may communicate with the service provider via a network, and the devices 110a-c may communicate with each other using a peer-to-peer protocol. Examples of the devices 110a-c may include a cellular phone, personal digital assistant, laptop, desktop, set top box, server, or substantially any device or apparatus including a computer system operable to perform the functions of the embodiments described herein. Communication between the devices 110a-c and between the devices 110a-c and the service provider 115 may include wired and/or wireless connections.

FIG. 5 illustrates a block diagram of a general purpose computer system 500 that is operable to be used as a platform for the components of the system 100 described above. For example, the system 500 may be representative of a platform for one or more of the devices 110a-c and the service provider 115. Components may be added or removed from the general purpose system 500 to provide the desired functionality.

The system 500 includes a processor 502, providing an execution platform for executing software. Commands and data from the processor 502 are communicated over a communication bus 503. The system 500 also includes a main memory 506, such as a Random Access Memory (RAM), where software may reside during runtime, and a secondary memory 508. The secondary memory 508 may include, for example, a nonvolatile memory where a copy of software or content objects or rights objects are stored. In one example, the secondary memory 508 also includes ROM (read only memory), EPROM (erasable, programmable ROM), is EEPROM (electrically erasable, programmable ROM), flash memory or hard disk drive (HDD).

The system 500 includes I/O devices 510. The I/O devices may include a display and/or user interfaces comprising one or more I/O devices 510, such as a keyboard, a mouse, a stylus, speaker, and the like. A communication interface 509 is provided for communicating with other components. The communication interface 509 may be a wired or a wireless interface. The communication interface 509 may be a network interface. The components of the system 500 may communicate over the bus 503. The system 500 also includes a content or multimedia processing unit 511 and a cryptographic unit 512. These units may be embodied in hardware, software or a combination of both.

One or more of the steps of the methods described in FIGS. 4A-C and other steps described herein and software described herein may be implemented as software embedded or stored on a computer readable medium and executed by a processor. The steps may be embodied by a computer program, which may exist in a variety of forms both active and inactive. For example, they may exist as software program(s) comprised of program instructions in source code, object code, executable code or other formats for performing some of the steps when executed. Modules include software, such as programs, subroutines, objects, etc. Any of the above may be stored on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated herein may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A non-transitory computer-readable medium having instructions stored thereon that, in response to execution, cause a system including a processor to perform operations comprising:
    creating, at a service provider, a domain of members to facilitate sharing of content objects amongst the members of the domain; and
    creating, at the service provider, a domain membership rights object (DMRO) for each member of the domain, wherein each DMRO includes permissions for a particular member in the domain to consume one or more of the content objects;
    sending a content object to a member of the domain, wherein the content object is encrypted with a content encryption key;
    sending a rights object for the content object to the member of the domain, the rights object including the content encryption key encrypted with a subdomain key for a subdomain of the domain, wherein the subdomain includes a subset of the members of the domain; and
    sending the DMRO for the member to the member, wherein the DMRO for the member includes the permissions for the member to consume the content object, and includes the subdomain key encrypted with a unique cryptographic key for the member or includes a domain key encrypted with a unique cryptographic key for the member wherein the domain key enables access to subdomain keys corresponding to all subdomains of that domain.

2. The non-transitory computer-readable medium of claim 1, wherein at least two DMROs have different permissions for different members of the domain.

3. The non-transitory computer-readable medium of claim 1, wherein the permissions comprise at least one of a maximum number of times a content object in the domain can be played or copied, a limited period of time that the members of the domain are allowed to consume the content object, an age restriction, or content type restriction.

4. The non-transitory computer-readable medium of claim 1, wherein the DMROs for the members of the subdomain include different permissions than a DMRO for at least one other member of the domain that does not have membership to the subdomain.

5. The non-transitory computer-readable medium of claim 1, wherein each DMRO is only applicable to a specific device that is a member of the domain.

6. The non-transitory computer-readable medium of claim 1, the operations further comprising:
    sending DMROs that enable access to a new domain key to predetermined members of the domain after a member is removed from the domain.

7. The non-transitory computer-readable medium of claim 1, the operations further comprising:
    sending the DMRO for the member to the member upon request of the domain member.

8. The non-transitory computer-readable medium of claim 7, wherein the request is automatically generated in response to determining a domain key identified by a rights object for a content object in the domain is unavailable locally at a device.

9. The non-transitory computer-readable medium of claim 7, wherein the request is automatically generated in response to determining a particular generation of a domain key identified by a rights object for a content object in the domain is unavailable locally at a device.

10. A method of providing permissions to consume content objects within a domain, the method comprising:
   creating, at a service provider, a domain of members to facilitate sharing of content objects amongst the members of the domain;
   creating, at the service provider, a domain membership rights object (DMRO) for each member of the domain, wherein each DMRO includes permissions for a particular member in the domain to consume one or more of the content objects;
   sending a content object to a member of the domain, wherein the content object is encrypted with a content encryption key;
   sending a rights object for the content object to the member of the domain, the rights object including the content encryption key encrypted with a subdomain key for a subdomain of the domain, wherein the subdomain includes a subset of the members of the domain; and
   sending the DMRO for the member to the member, wherein the DMRO for the member includes the permissions for the member to consume the content object, and includes the subdomain key encrypted with a unique cryptographic key for the member or includes a domain key encrypted with a unique cryptographic key for the member wherein the domain key enables access to subdomain keys corresponding to all subdomains of that domain.

11. The method of claim 10, wherein at least two DMROs have different permissions for different members of the domain.

12. The method of claim 10, wherein the permissions comprise at least one of a maximum number of times a content object in the domain can be played or copied, a limited period of time that the members of the domain are allowed to consume the content object, an age restriction, or a content type restriction.

13. The method of claim 10, wherein the DMROs for the members of the subdomain include different permissions than a DMRO for at least one other member of the domain that does not have membership to the subdomain.

14. The method of claim 10, further comprising:
sending DMROs that enable access to a new domain key to predetermined members of the domain after a member is removed from the domain.

15. A system, comprising:
a hardware processor; and
a memory communicatively coupled to the processor, the memory having stored therein computer-executable instructions, comprising:
   a service provider software component configured to:
      create a domain of members to facilitate sharing of content objects amongst the members of the domain;
      create a domain membership rights object (DMRO) for each member of the domain, wherein each DMRO includes permissions for a particular member in the domain to consume one or more of the content objects;
      send a content object to a member of the domain, wherein the content object is encrypted with a content encryption key;
      send a rights object for the content object to the member of the domain, the rights object including the content encryption key encrypted with a subdomain key for a subdomain of the domain, wherein the subdomain includes a subset of the members of the domain; and
      send the DMRO for the member to the member, wherein the DMRO for the member includes the permissions for the member to consume the content object, and includes the subdomain key encrypted with a unique cryptographic key for the member or includes a domain key encrypted with a unique cryptographic key for the member wherein the domain key enables access to subdomain keys corresponding to all subdomains of that domain.

16. The system of claim 15, at least two DMROs have different permissions for different members of the domain.

17. The system of claim 15, wherein the DMROs for the members of the subdomain include different permissions than the DMROs for at least one other member of the domain that does not have membership to the subdomain.

* * * * *

UNITED STATES PATENT AND TRADEMARK OFFICE
CERTIFICATE OF CORRECTION

PATENT NO.      : 9,154,508 B2  Page 1 of 1
APPLICATION NO. : 11/962953
DATED           : October 6, 2015
INVENTOR(S)     : Petr Peterka et al.

It is certified that error appears in the above-identified patent and that said Letters Patent is hereby corrected as shown below:

In the claims
Column 8, line 15, In claim 1, "domain," should be "domain."

Signed and Sealed this
Ninth Day of February, 2016

Michelle K. Lee
*Director of the United States Patent and Trademark Office*